(12) United States Patent
Huseynov et al.

(10) Patent No.: US 8,955,383 B2
(45) Date of Patent: Feb. 17, 2015

(54) ULTRASONIC GAS LEAK DETECTOR WITH FALSE ALARM DISCRIMINATION

(75) Inventors: Javid J. Huseynov, Fountain Valley, CA (US); John G. Romero, Rancho Santa Margarita, CA (US); Shankar B. Baliga, Irvine, CA (US)

(73) Assignee: General Monitors, Inc., Lake Forest, CA (US)

( * ) Notice: Subject to any disclaimer, the term of this patent is extended or adjusted under 35 U.S.C. 154(b) by 289 days.

(21) Appl. No.: 13/535,182

(22) Filed: Jun. 27, 2012

(65) Prior Publication Data
US 2014/0000347 A1    Jan. 2, 2014

(51) Int. Cl.
*G01N 29/32* (2006.01)
(52) U.S. Cl.
USPC .................................. 73/592; 73/40.5 A
(58) Field of Classification Search
CPC ........ G01M 3/24; G01M 3/243; G01M 3/246
USPC ....................................................... 73/40.5 A
See application file for complete search history.

(56) References Cited

U.S. PATENT DOCUMENTS

| | | | |
|---|---|---|---|
| 5,521,840 A * | 5/1996 | Bednar | 702/183 |
| 5,533,383 A | 7/1996 | Greene et al. | |
| 7,202,794 B2 | 4/2007 | Huseynov et al. | |
| 2006/0017578 A1 | 1/2006 | Shubinsky et al. | |
| 2009/0060246 A1 | 3/2009 | Baliga et al. | |
| 2011/0018996 A1 * | 1/2011 | Mian et al. | 348/143 |

FOREIGN PATENT DOCUMENTS

GB            2367362          4/2002

OTHER PUBLICATIONS

PCT/US2013/047202, International Search Report and Written Opinion of the International Searching Authority, mailed Nov. 5, 2013.
"Safe Detection of Small to Large Gas Releases," E Naranjo, S. Baliga, G.A. Neethling and C.D. Plummer, Hydrocarbon Processing, Jan. 2011, pp. 57-60.

* cited by examiner

*Primary Examiner* — Paul West
(74) *Attorney, Agent, or Firm* — Larry K. Roberts

(57) ABSTRACT

An ultrasonic gas leak detector is configured to discriminate the ultrasound generated by a pressurized gas leak into the atmosphere from false alarm ultrasound. An exemplary embodiment includes a sensor for detecting ultrasonic energy and providing sensor signals, and an electronic controller responsive to the sensor signals. In one exemplary embodiment, the electronic controller is configured to provide a threshold comparator function to compare a sensor signal value representative of sensed ultrasonic energy to a gas detection threshold value, and an Artificial Neural Network (ANN) function for processing signals derived from the digital sensor signals and applying ANN coefficients configured to discriminate false alarm sources from gas leaks. An output function generates detector outputs in dependence on the threshold comparator output and the ANN output.

18 Claims, 5 Drawing Sheets

ULTRASONIC GAS LEAK DETECTOR WITH FALSE ALARM DISCRIMINATION

BACKGROUND

Ultrasonic gas leak detectors measure the sound pressure waves generated by the turbulent flow when gas escapes from higher pressures to the ambient atmosphere. Such gas leak detectors are used as industrial safety devices to monitor the unwanted or unexpected release of combustible or toxic gases into the atmosphere. The leaks need to be identified quickly before they grow further in magnitude, to allow for timely remedial action to be taken.

Conventional ultrasonic gas leak detectors are threshold devices that cannot discriminate between the ultrasound created by other manmade or natural sources, such as machinery, electrical discharge, acoustic speakers or biological sources, from those produced by real gas leaks. A way to mitigate false alarms, avert nuisance trips, and avoid costly unwarranted process shutdowns with such ultrasonic gas leak detectors is to raise the alarm threshold level several decibels above the background ultrasonic level. Raising the alarm level has the drawback of reducing detection distance to the gas leak, thereby the total area of coverage, or of ignoring gas leaks until they build up in severity, often with catastrophic consequences. Another precaution against false alarms is via the use of lengthy time delays which result in undesirable delays to the remedial action in case of a dangerous gas leak, negating the benefit of the fast response time inherent with ultrasonic gas leak detectors.

Another drawback of conventional ultrasonic gas leak detectors that depend on thresholds and time delays for their functionality is the inability to effectively verify their performance in the field, and to conduct functional safety checks at proof test intervals. The conventional gas leak detectors are unable to differentiate between the sound emitted by a real gas release and a remote ultrasonic test source to be used for periodic system performance check. This is a major inconvenience to the industrial facility that leads to either the bypassing of critical proof testing or a significant operating cost burden. Conventional ultrasonic gas leak detectors provide maintenance personnel with no means to test the gas leak detector without the disruption caused by disabling alarms.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
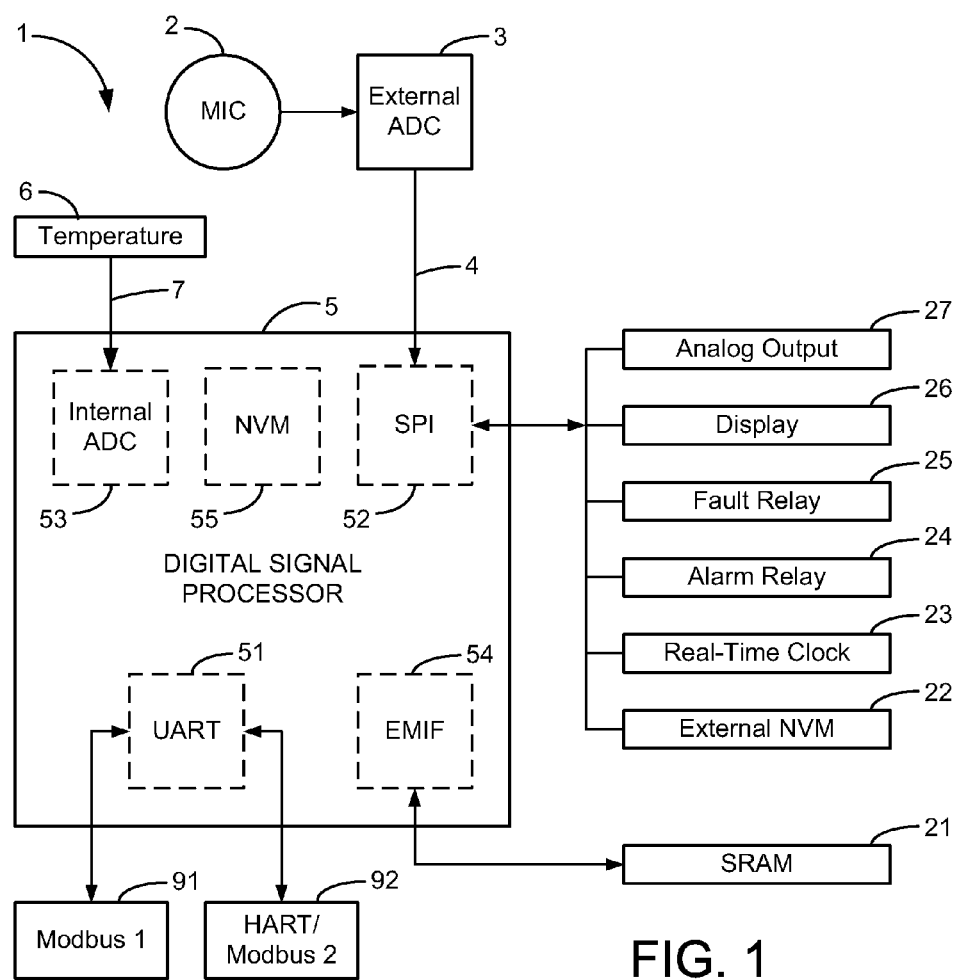
FIG. 1 is a schematic block diagram of an exemplary embodiment of an ultrasonic gas leak detection system with false alarm discrimination.

In the following detailed description and in the several figures of the drawing, like elements are identified with like reference numerals. The figures are not to scale, and relative feature sizes may be exaggerated for illustrative purposes.

FIG. 1 illustrates a schematic block diagram of an exemplary ultrasonic gas leak detection system 1 including an ultrasonic microphone 2 as a sensing element. In an exemplary embodiment, the ultrasonic microphone 2 may be a pre-polarized pressure microphone, such as manufactured by G.R.A.S. Sound and Vibration of Nolte, Denmark, Microtech Gefell GmbH of Gefell, Germany, or Bruel Kjaer of Naerum, Denmark. The ultrasonic region is defined as a frequency range beyond human hearing, starting at approximately 20 kHz in healthy, young human adults. Higher ultrasonic frequencies are attenuated more rapidly in air than lower frequencies, and the practical applications for an ultrasonic gas leak detection system are typically for frequencies less than 100 kHz.

In another exemplary embodiment, the ultrasonic microphone 2 may be a fiber optical microphone (FOM). An exemplary FOM suitable for the purpose is manufactured by Sennheiser Electronic GmbH of Wedemark, Germany. Another manufacturer of fiber optic microphones is Optoacoustics of Moshav Mazor, Israel.

In yet another exemplary embodiment, the ultrasonic microphone 2 may be a miniature microphone based on MEMS (Micro Electro Mechanical Systems) technology that can be operated well beyond the audible range of 15 kHz and into the ultrasonic frequency range out to 100 kHz. Such a MEMS microphone may be mounted on a printed circuit board (PCB) and housed in an environmentally robust mechanical enclosure that permits passage of ultrasonic sound energy to the sensing element. An exemplary MEMS microphone that may be used in such fashion is the SiSonic™ Surface Mount Microphone manufactured by Knowles Acoustics of Itasca, Ill. In an exemplary embodiment suitable for operation in a hazardous location, the MEMS microphone may be housed behind a flame arrestor. Such a flame arrestor prevents the transmission of ignited flames from within the microphone housing structure to the external environment while permitting acoustic energy to flow from the external environment to the microphone. Such a method of protection is known as explosion proof or flame proof. Some of the standards that are widely accepted by the industry and government regulatory bodies for explosion proof or flame proof designs are CSA C22.2 No. 30-M1986 from the Canadian Standards Association, FM 3600 and 3615 from Factory Mutual, and IEC 60079-0 and IEC 60079-1 from the International Electrotechnical Commission. Other protection methods may be applied for other environmental protection requirements such as ingress protection against sold objects, liquids, and mechanical impact as described in IEC 60529 from the International Electrotechnical Commission.

Regardless of the microphone type and protection concept utilized, the analog signal generated by the microphone 2 is converted into a digital signal by an analog to digital converter (ADC) 3. In an exemplary embodiment, the ADC 3 provides a signal 4 with 12-bit signed integer resolution and a sampling rate of 200 kHz.

In an exemplary embodiment, the ultrasonic gas leak detection system 1 includes an electronic controller 5, e.g., a digital signal processor (DSP), an ASIC or a microcomputer or microprocessor based system. In an exemplary embodiment, the signal processor 5 may comprise a DSP, although other devices or logic circuits may alternatively be employed for other applications and embodiments. In an exemplary embodiment, the signal processor 5 also comprises a dual universal asynchronous receiver transmitter (UART) 51 as a serial communication interface (SCI), a serial peripheral interface (SPI) 52, an internal ADC 53, an external memory interface (EMIF) 54 for an external memory (SRAM) 21, and a non-volatile memory (NVM) 55 for on-chip data storage. Modbus 91 or HART 92 protocols may serve as interfaces for serial communication over UART 51. Both protocols are well-known in process industries, along with others such as PROFIbus, Fieldbus and CANbus, for interfacing field instrumentation to the user's computer or programmable logic controller (PLC).

In an exemplary embodiment, signal processor 5 receives the digital detector signals 4 from the ADC 3 through the SPI 52. In an exemplary embodiment, the signal processor 5 is connected to a plurality of other interfaces through the SPI 52. These interfaces may include an external NVM 22, a real-time clock 23, an alarm relay 24, a fault relay 25, a display 26, and an analog output 27.

In an exemplary embodiment, the analog output 27 may produce an indicative current level between 0 and 20 milliamps (mA), which can be used to trigger a remedial action, such as, by way of example only, shutting down process equipment pursuant to an established facility protocol. A first current level at the analog output 27, for example between 4 mA and 20 mA, may be indicative of a gas leak, a second current level at the analog output 27, for example 4 mA, may be indicative of normal operation, e.g., when no gas leak is present, and a third current level at the analog output 27, for example, 0 mA, may be indicative of a system fault, which could be caused by conditions such as electrical malfunction. In other embodiments, other current levels may be selected to represent various conditions.

In an exemplary embodiment, ultrasonic gas leak detection system 1 may also include a temperature sensor 6 for providing a temperature signal 7, indicative of an ambient temperature of the gas detector system for subsequent temperature compensation. The temperature detector 6 may be connected to the internal ADC 53 of the signal processor 5, which converts the temperature signal 7 into a digital representation.

In an exemplary embodiment, the signal processor 5 is programmed to perform signal pre-processing and artificial neural network (ANN) processing, as discussed more fully below.

Figure 2:
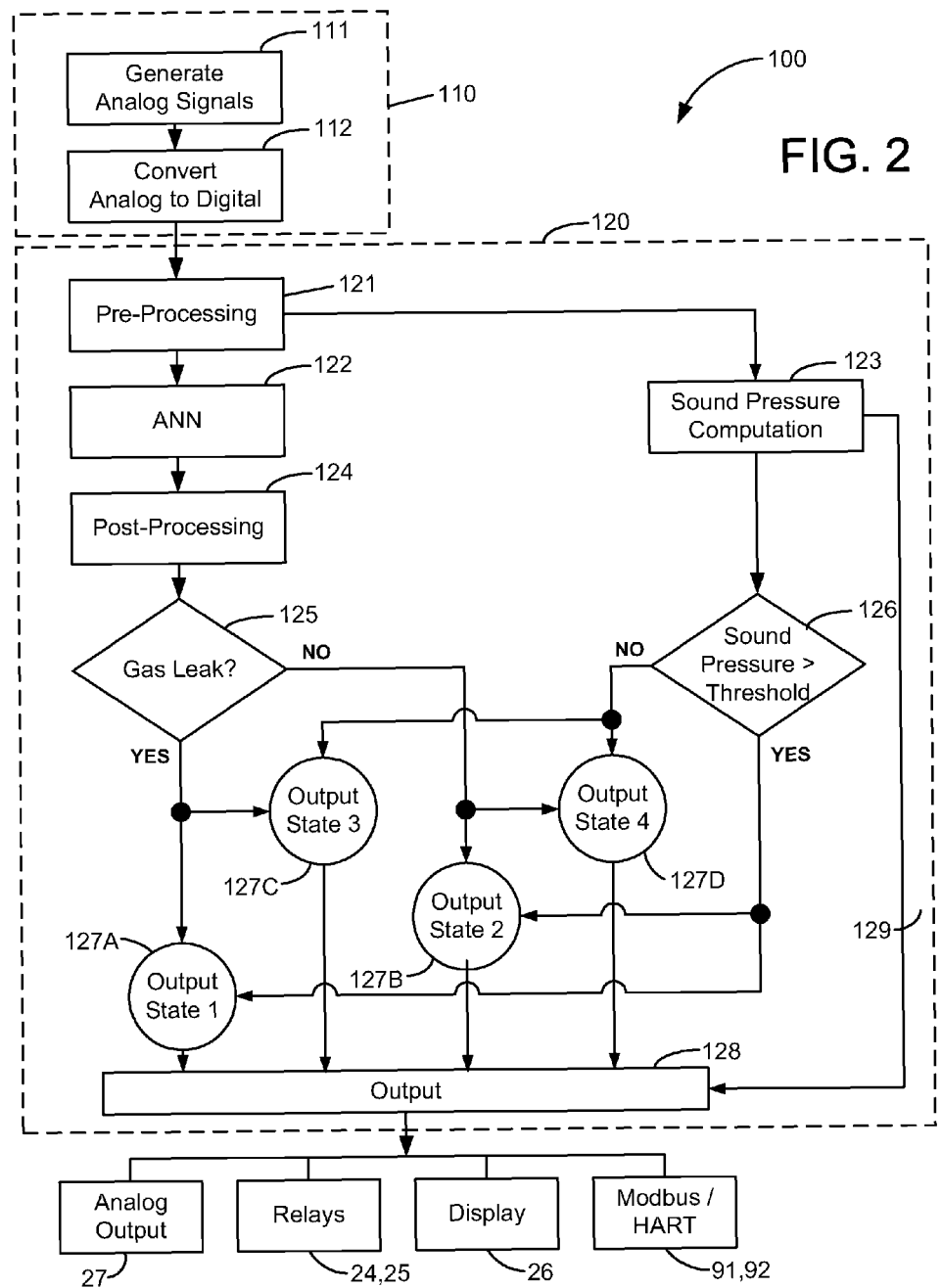
FIG. 2 is a functional block diagram of features of the detection system of FIG. 1.

FIG. 2 is an exemplary functional block diagram 100 of an exemplary gas detection system. The system includes a sensor data collection function 110, which collects the analog sensor signals 111 from the microphone sensor, and converts the sensor signals into digital form 112 for processing by the digital signal processor. Processing algorithms 120 are then applied to the sensor data, including signal pre-processing 121, ANN validation function 122, sound pressure computation 123, and post-processing 124 to determine the sensor state. In an exemplary embodiment, the computed sound pressure level (SPL) is compared against a preset threshold 126, while the post processed ANN provides a determination as to whether the microphone signal is generated by a real gas leak 125. In an exemplary embodiment, the combination of the decision blocks 125 and 126 result in four combinations:

Output state 127A for combination (1) Yes to Gas Leak & (2) Yes to SPL>threshold
Output state 127B for combination (1) No to Gas Leak & (2) Yes to SPL>threshold
Output state 127C for combination (1) Yes to Gas Leak & (2) No to SPL>threshold
Output state 127D for combination (1) No to Gas Leak & (2) No to SPL>threshold Output state 127A corresponds to the case of a real gas leak and one that exceeds the SPL threshold (126). The threshold value (126) may be considered a gas detection threshold; the user may choose to set a higher alarm threshold for alarm relay 24 in the output block 128. Output state 127A also includes the more general case of a real gas leak in the presence of a false alarm (background noise) as the ANN is trained to classify such a situation as a real gas leak. Output state 127B corresponds to the situation where the large measured SPL has been diagnosed as not being caused by a gas leak, but rather from a false alarm source. Output state 127C corresponds to the detection of a real gas leak, but small enough in magnitude to produce an SPL less than the threshold (126). Output state 127C may be considered to be a minor leak, or to provide a warning to the user of an imminent larger leak. The user would typically not take corrective action but is advised to monitor the facility more closely. Output state 127D corresponds to the situation where nothing much is happening; there is no evidence of a gas leak and the background SPL is at a value considered insignificant. Output state 127D would be typical of a quiet industrial environment such as a remote onshore wellhead.

The information from output states 127A, 127B, 127C, and 127D is continuously transmitted via output block 128 to the relays 24 and 25, display 26, analog output 27, and external communication interfaces such as Modbus 91 and HART 92. Output block 128 may be programmed by the user to define what is sent to the various user interfaces, e.g., the display may indicate the SPL regardless of it being caused by a gas leak or a false alarm, or the display may indicate the SPL only when it is determined to be caused by a real gas leak. It is also possible for the user to configure output block 128 to directly show just the SPL measured and transmitted via 129 regardless of the status of the output states 127A, 127B, 127C, and 127D; in this manner the effect of ANN processing and decision making can be bypassed temporarily or permanently, as required. The user may also set an alarm SPL threshold via output block 128 to activate alarm relay 24 that is higher than the minimum gas detection threshold used in decision block 126. The user may also program the output block 128 with a user settable time delay to ensure that an ANN determined gas leak lasts for certain duration before taking corrective action, via, for example, alarm relay 24.

The exemplary embodiment of ultrasonic gas leak detection system 1 described in FIG. 1 and FIG. 2 provides means for distinguishing the ultrasound generated by pressurized gas leaking into the atmosphere from the ultrasound generated by other mechanical, electrical discharge, acoustic or biological sources in the vicinity. The ultrasound from such other sources, classified as false alarms, may produce a large background ultrasound reading with prior art ultrasonic gas leak detectors: this high background results in the setting of elevated alarm levels, typically 6 decibels above the background ultrasound. Raising the alarm level has the drawback of reducing detection distance to the gas leak and thereby the total area of coverage, resulting in an area gas leak monitor behaving more like a point gas leak detector. Additionally, real gas leaks may be ignored until they build up in severity, often with catastrophic consequences. False alarm sources that produce transient or short lived ultrasound are also handled with prior art ultrasonic gas leak detectors via the use of time delays, which result in undesirable delays to the remedial action in case of a dangerous gas leak. A method for the reliable discrimination and quantification of gas leaks provides room for lowering the alarm level thereby extending the range of detection and area of coverage, as well as for reducing time delays to remedial action. Such a method may enable the ultrasonic gas leak detection system to provide one or more of the following benefits, (1) an area monitor, (2) a response time based on the speed of sound, and (3) an increase in overall process production due to the reduction of nuisance alarms.

Figure 3:
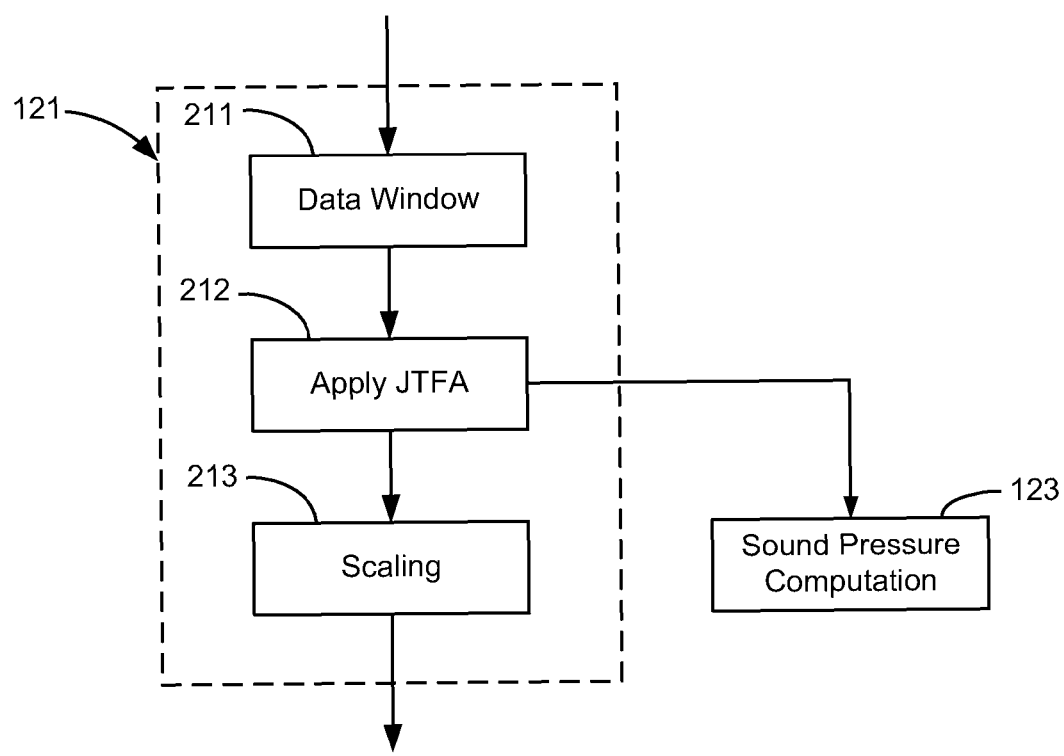
FIG. 3 is an exemplary flow diagram of the pre-processing functions utilized in the detection system of FIG. 2.

In an exemplary embodiment, the analog signals from the microphone 2 are periodically converted to digital form by the ADC 3. As shown in FIG. 2, pre-processing 121 is performed on the digitized sensor signals. In an exemplary embodiment, an objective of the pre-processing function 121 is to establish a correlation between frequency and time domain of the signal. In an exemplary embodiment shown in FIG. 3, the pre-processing function 121 includes applying 211 a data windowing function and applying 212 a Joint Time-Frequency Analysis (JTFA) function. In an exemplary embodiment, data windowing function 211 involves applying one of a Hanning, Hamming, Parzen, rectangular, Gauss, exponential or other appropriate data windowing function. In an exemplary embodiment, the data window function 211 comprises a Hamming window function which is described by a cosine type function:

$$W^{Hm} = \frac{1}{2}\left\{1.08 - 0.92\cos\left(\frac{2\pi n}{N-1}\right)\right\}$$

where N is number of sample points (e.g. 512) and n is between 1 and N.

In an exemplary embodiment of the data preprocessing 121, the Hamming window function is applied 211 to a raw input signal before applying 212 a JTFA function. This data windowing function alleviates spectral "leakage" of the signal and thus improves the accuracy of ANN classification.

Referring again to FIG. 3, in an exemplary embodiment, JTFA 212 encompasses a Discrete Fourier Transform. The JTFA may also encompass a Short-Time Fourier Transform (STFT) with a shifting time window (also known as Gabor transform), or a Discrete Wavelet Transform (DWT). The JTFA application is followed by a scaling operation 213; this normalizes the data by subtracting the mean and dividing by the standard deviation to effectively scale the inputs to the ANN 122 (FIG. 2). In an exemplary embodiment, coefficients and algorithms used for the windowing function 211, JTFA 212, and the scaling function 213 are stored in non-volatile memory. In an exemplary embodiment, the coefficients may be stored in NVM 55 (FIG. 1).

Referring again to FIG. 2 and FIG. 3, the pre-processed data after application of the windowing function and JTFA operation is also fed into the block 123 for sound pressure computation. The SPL is computed by summing over the magnitude of the intensities at the various ultrasonic frequencies utilized in the Fourier Transform and normalized by a calibration factor dependent on the microphone sensitivity and electronic gain. The ultrasonic SPL is expressed in decibels (dB), which is a logarithmic measure of the effective pressure of sound relative to a reference value. The commonly used "zero" reference sound pressure (0 dB) in air is 20 µPa RMS, historically derived from the threshold of human hearing. The typical values of ultrasonic SPL in a quiet industrial environment such as remote onshore wellheads may be between 40 dB and 58 dB, while the background ultrasonic SPL can be much higher in the presence of machinery in operation such as compressors, generators and coolers (fin-fans).

The computed SPL from computation 123 is compared against a threshold in decision block 126 (FIG. 2). The SPL calibration factor for 123 and SPL threshold value for 126 may be stored in non-volatile memory NVM 55.

Figure 4:
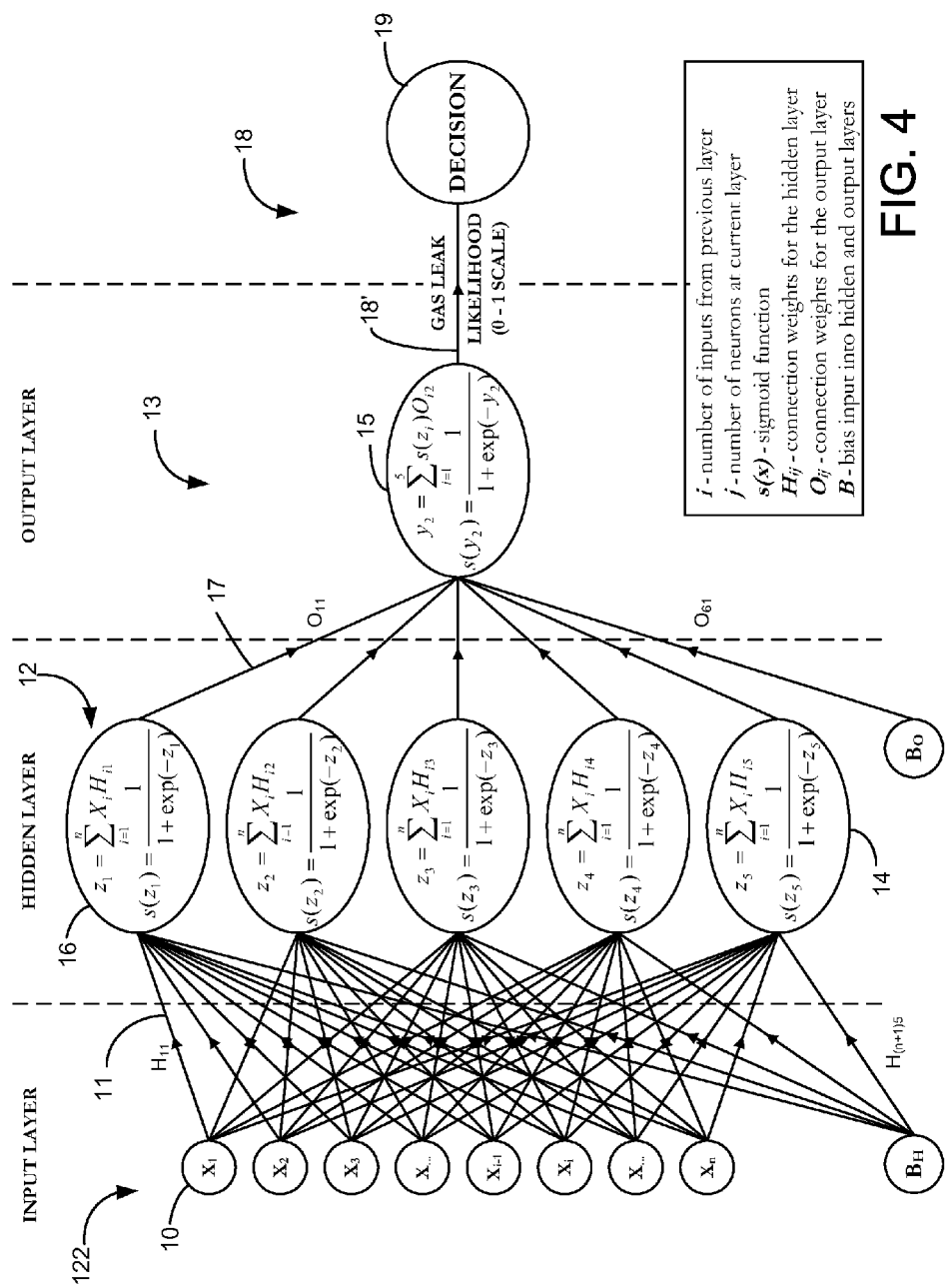
FIG. 4 illustrates an exemplary embodiment of artificial neural network (ANN) processing utilized in the detection system of FIG. 2.

FIG. 4 illustrates a functional block diagram of an exemplary embodiment of ANN processing 122. ANN processing 122 may comprise two-layer ANN processing. In an exemplary embodiment, ANN processing 122 includes receiving a plurality of pre-processed signals 121 (x1-xi) (corresponding to the data windowed 211, JTFA processed 212, and scaled signals 213 shown in FIG. 3), a hidden layer 12 and an output layer 13. In other exemplary embodiments, ANN processing 122 may comprise a plurality of hidden layers 12.

In an exemplary embodiment, the hidden layer 12 includes a plurality of artificial neurons 14, for example five neurons as shown in FIG. 4. The number of neurons 14, known as hidden neurons, may depend on the level of training and classification achieved by the ANN processing 122 during training. In an exemplary embodiment, the output layer 13 includes a plurality of targets 15 (or output neurons) corresponding to various conditions. The number of targets 15 may be, for example, from one to four. The exemplary embodiment of FIG. 4 employs one target neuron 15, which outputs event likelihood 18' to decision processing 19.

In an exemplary embodiment, the NVM 55 (FIG. 1) holds synaptic connection weights $H_{ij}$ 11 for the hidden layer 12 and synaptic connection weights $O_{jk}$ 17 for the output layer 13. In an exemplary embodiment, the signal processor 5 sums the plurality of pre-processed signals 10 at neuron 14, each multiplied by the corresponding synaptic connection weight $H_{ij}$ 11. A non-linear activation (or squashing) function 16 is then applied to the resultant weighted sum $z_i$ for each of the plurality of hidden neurons 14. In an exemplary embodiment, shown in FIG. 4, the activation function 16 is a unipolar sigmoid function ($s(z_i)$). In other embodiments, the activation function 16 can be a bipolar activation function or other appropriate function. In an exemplary embodiment, a bias $B_H$ is also an input to the hidden layer 12. In an exemplary embodiment, the bias $B_H$ has the value of one. Referring again to FIG. 4, in an exemplary embodiment, the neuron outputs ($s(z_i)$) are input to the output layer 15. In an exemplary embodiment, a bias $B_O$ is also an input to the output layer 15. In an exemplary embodiment, the outputs ($s(z_i)$) are each multiplied by a corresponding synaptic connection weight $O_{jk}$ 17 and the corresponding results are summed for output target 15 in the output layer 13, resulting in a corresponding sum $y_j$.

Thus, as depicted in FIG. 4, the signal-processed inputs $X_i$ 10 are connected to hidden neurons 14, and the connections between input and hidden layers are assigned weights $H_{ij}$ 11. At every hidden neuron, the multiplication, summation and sigmoid function are applied in the following order.

$$Z_j = \sum_{i=1}^{n} X_i H_{ij}$$

$$S(Z_j) = \frac{1}{1 + \exp(-Z_j)}$$

The outputs of sigmoid function $S(Z_j)$ from the hidden layer 12 are introduced to the output layer 13. The connections between hidden and output layers are assigned weights $O_{jk}$ 17. Now at every output neuron multiplication, in this exemplary embodiment, summation and sigmoid function are applied in the following order:

$$Y_k = \sum_{i=1}^{n} S(Z_j)O_{jk}$$

$$S(Y_k) = \frac{1}{1 + \exp(-Y_k)}$$

In an exemplary process of ANN training, the connection weights $H_{ij}$ and $O_{jk}$ are constantly optimized by Back Propagation (BP). In an exemplary embodiment, the BP algorithm applied is based on mean root square error minimization via the conjugate-gradient (CG) descent method. The algorithm is applied using MATLAB, a tool for numerical computation and data analysis, to optimize the connection weights $H_{ij}$ and $O_{jk}$. These connection weights are then used in ANN validation, to compute the ANN outputs $S(Y_k)$, which are used for final decision making. In an exemplary embodiment, an ANN may be trained by exposing the ultrasonic gas leak detector to a plurality of combinations of ultrasound generated by real gas leaks, false alarm sources comprising mechanical, electrical discharge, acoustic, or biological sources, and combinations of real gas leaks and false alarm sources. During training the output values are compared with the correct answer; the algorithm adjusts the weights of each connection $H_{ij}$ and $O_{jk}$ in order to reduce the value of the error function at each iteration. After repeating this process for a sufficiently large number of training cycles, the network usually converges to a state where the error is small. Multi-layered ANNs and ANN training using the BP algorithm to set synaptic connection weights are described, e.g. in Rumelhart, D. E., Hinton, G. E. & Williams, R. J., Learning Representations by Back-Propagating Errors, (1986) Nature, 323, 533-536. It is shown that a multilayer network, containing one or two layers of hidden nodes, is required to handle non-linear decision boundaries.

In an exemplary embodiment, the training for the ANN employs a set of robust indoor, outdoor, and industrial site tests. Data collected from these tests is used for ANN training performed on a personal or workstation computer equipped with MATLAB or a similar numerical computing program. The data can be collected using the hardware shown in FIG. 1, suitably mounted on a portable platform. Alternately, a commercially available ultrasonic microphone and recorder, such as the Model D1000X ultrasound detector from Pettersson Electronik, Uppsala, Sweden, can be used for data collection. False alarm sources used for both indoor and outdoor collection include ultrasonic dog whistles that use piezoelectric transducers to generate high intensity, single frequency ultrasound; mechanical sources of ultrasound include metal grinders and sand blasters; electrical discharge sources of ultrasound include welding and corona discharge. Field data collected from industrial sites may include noise generated by compressors, generators, choke valves, separators, and coolers (fin-fans). Data collected from real gas leaks may include a plurality of gas types, pressures, orifice sizes and flow rates. Gases under consideration could include those of low molecular weight such as hydrogen and methane, as well as those of higher molecular weight such as carbon dioxide, ethylene and propane. It should be noted that many of the gases with higher molecular weight are in liquid state when under pressure; the ultrasound is generated when they became gaseous upon release to the atmosphere. Technical details of the experimental setup to generate such gas leaks are described, e.g. in Naranjo, E., Baliga, S., Neethling, G. A., & Plummer, C. D., Safe Detection of Small to Large Gas Releases, (January 2011) Hydrocarbon Processing, 57-60.

In an exemplary embodiment, the training data may include over one hundred such files of ultrasound produced by a plurality of false alarm sources, real gas leaks and combinations of real gas leaks and false alarm sources. The connection weights $H_{ij}$ and $O_{jk}$ derived from such comprehensive ANN training can be loaded into the software of prototype ultrasonic gas leak detectors for further validation by rigorous laboratory and field testing for false alarm rejection and consistent gas leak detection (via decision block 125, FIG. 2), and accurate SPL computation (via 123, FIG. 2). Subsequent to the successful validation, the connection weights $H_{ij}$ and $O_{jk}$ may be programmed into manufactured units.

In an exemplary embodiment illustrated in FIG. 4, the ANN processing 122 outputs value 18' that represent a percentage likelihood of a gas leak detected via ultrasonic gas leak detection. A threshold applied to the output, sets the limit of the likelihood, above which a gas leak condition is indicated. In an exemplary embodiment, neuron output 18' value above 0.9 (on a scale of 0 to 1) indicates a strong likelihood of gas leak, whereas a smaller output indicates a strong likelihood of false alarm conditions. This analysis is conducted in ANN decision block 19.

Referring back to FIG. 2, post-processing 124 takes the output of the ANN 122 via the ANN decision block 19 (FIG. 4) and performs a final post-processing that may include other criteria such as factory or user defined criteria. Post-processing 124 may include post-processing such as counting the number of times the neuron output 18' exceeds a threshold value as defined by the ANN decision block 19. For example, it may be desirable to have the neuron output 18' exceed a threshold four times within a given time period, for example one second, before the gas leak condition is output. This limits the likelihood of an isolated spurious input condition or transient to be interpreted as a gas leak condition thus causing a false alarm. In an exemplary embodiment, the threshold value may be set at 0.8 on a scale of 0 to 1.

Referring to FIG. 2, the output of the post-processing 124 is processed by decision block 125. In an exemplary embodiment, if ANN decision block 125 determines that a gas leak has occurred this decision is tied in with the output of threshold decision block 126 that compares the computed SPL versus a preset gas detection threshold. As described earlier, four output state combinations 127A, 127B, 127C, and 127D are possible for this exemplary embodiment. The outputs of these output states 127A, 127B, 127C, and 127D are continuously transmitted via output block 128 to the relays 24 and 25, display 26, analog output 27, and external communication interfaces such as Modbus 91 and HART 92. Output block 128 may be programmed by the user to define what is sent to the various user interfaces, e.g., the display may indicate the SPL regardless of whether it is caused by a gas leak or false alarm, or the display may indicate the SPL only when it is determined to be caused by a real gas leak. The user may also set an alarm SPL threshold via output block 128 to activate alarm relay 24 that is higher than the minimum gas threshold set for decision block 126. The user may also program the output block 128 with a user settable time delay to ensure that an ANN determined gas leak lasts for certain duration before taking corrective action via, for example, alarm relay 24.

Figure 5:
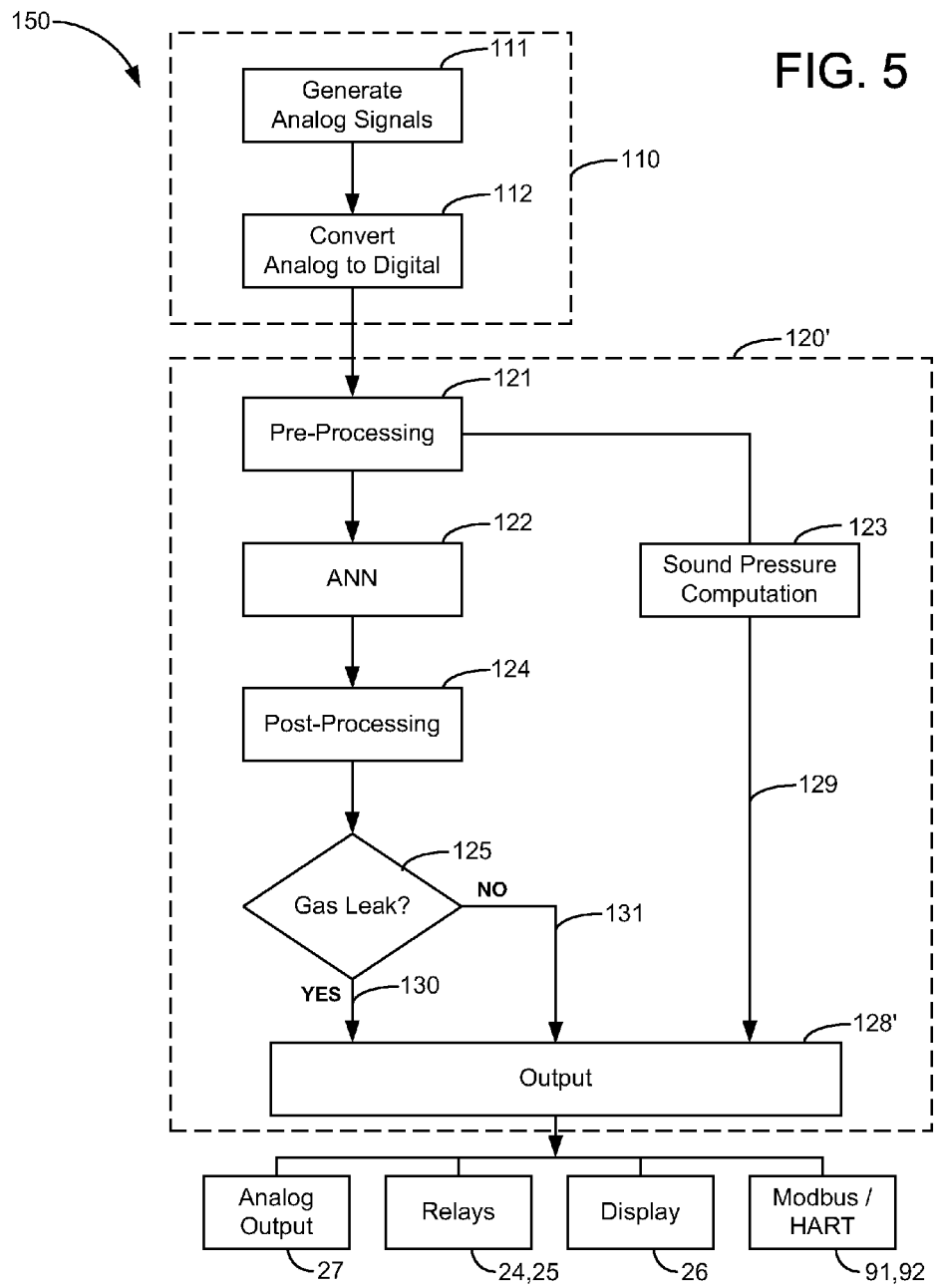
FIG. 5 is a functional block diagram of another exemplary embodiment of an ultrasonic gas leak detection system with false alarm discrimination.

Referring now to FIG. 5, features of another exemplary embodiment of an ultrasonic gas leak detector are depicted, depicting a functional block diagram 150 of the gas leak detector. This embodiment is similar to that described above regarding FIGS. 1-4. However, in this exemplary embodiment, the signal processor 5 is programmed to implement processing algorithms 120', in which the computed SPL from sound pressure computation 123 is not compared against a preset threshold as shown in block 126 of FIG. 2. Rather, the computed SPL 129 is sent directly to the output block 128'. At the same time, the post processed ANN provides a determination via decision block 125 as to whether the microphone signal is generated by a real gas leak indicated by output state 130 or by a false alarm as shown by output state 131, both in FIG. 5. The output block 128' then informs the user of the presence (from output state 130) and severity (in dB) (from signal 129) of a real gas leak via the output functions of the alarm relay 24, display 26, analog output 27, and external communication interfaces such as Modbus 91 and HART 92. If the computed SPL is shown to be created by a false alarm via output state 131 from decision block 125, the output block 128' can similarly inform the user of the false alarm event and its severity (in dB) via display 26, analog output 27, and external communication interfaces such as Modbus 91 and HART 92; in the case of a false alarm event indicated by output state 131 the alarm relay 24 would, however, not be activated.

Although the foregoing has been a description and illustration of specific embodiments of the invention, various modifications and changes thereto can be made by persons skilled in the art without departing from the scope and spirit of the invention.

What is claimed is:

1. An ultrasonic gas leak detector configured to discriminate the ultrasound generated by a pressurized gas leak into the atmosphere from false alarm ultrasound generated by other mechanical, electrical, acoustic or biological sources in the vicinity, comprising:
   a sensor for detecting ultrasonic energy and providing sensor signals;
   an electronic controller responsive to digital sensor signals representative of the sensor signals, the electronic controller comprising:
   a threshold comparator to compare a sensor signal value representative of sensed ultrasonic energy to a gas detection threshold value to determine whether the sensor signal value exceeds the gas detection threshold value to provide a threshold comparator output indicating whether a gas leak may have been detected, wherein the sensor signal value representative of sensed ultrasonic energy is a computed sound pressure value which is a logarithmic measure of an effective pressure of sound relative to a reference level;
   an Artificial Neural Network (ANN) for processing signals derived from the digital sensor signals and applying ANN coefficients configured to discriminate false alarm sources from gas leaks, and providing an ANN output indicating a decision whether a gas leak has been detected;
   an output decision generator for generating detector outputs in dependence on the threshold comparator output and the ANN output.

2. The system of claim 1, wherein the sensor is a MEMS microphone.

3. The system of claim 1, wherein the sensor is a fiber optical microphone.

4. The system of claim 1, wherein said detector outputs comprise one or more detector outputs indicating a condition resulting from the combination that the ANN output indicates a gas leak has been detected and the computed sound pressure value does not exceed the gas detection threshold value.

5. An ultrasonic gas leak detector configured to discriminate the ultrasound generated by a pressurized gas leak into the atmosphere from false alarm ultrasound generated by other mechanical, electrical, acoustic or biological sources in the vicinity, comprising:
   a sensor for detecting ultrasonic energy and providing sensor signals;
   an electronic controller responsive to digital sensor signals representative of the sensor signals, the electronic controller comprising:
   a threshold comparator to compare a sensor signal value representative of sensed ultrasonic energy to a gas detection threshold value to determine whether the sensor signal value exceeds the gas detection threshold value to provide a threshold comparator output indicating whether a gas leak may have been detected, wherein the sensor signal value representative of sensed ultrasonic energy is a computed sound pressure value;
   an Artificial Neural Network (ANN) for processing signals derived from the digital sensor signals and applying ANN coefficients configured to discriminate false alarm sources from gas leaks, and providing an ANN output indicating a decision whether a gas leak has been detected;
   an output decision generator for generating detector outputs in dependence on the threshold comparator output and the ANN output; and
   the output decision generator provides at least four output states, wherein:
   a first output state results from a combination that the ANN output signal indicates that a gas leak has been detected, and that the threshold comparator output signal indicates that a gas leak may have been detected;
   a second output state results from a combination that the ANN output signal indicates that a gas leak has not been detected, and that the threshold comparator output signal indicates that a gas leak may have been detected;
   a third output state results from the combination that the ANN output signal indicates that a gas leak has been detected, and that the threshold comparator output signal indicates that a gas leak has not been detected: and
   a fourth output state results from the combination that the ANN output signal indicates that a gas leak has not been detected, and that the threshold comparator output signal indicates that a gas leak has not been detected.

6. The system of claim 5, wherein the second output state corresponds to the detection state in which where the sound pressure value is diagnosed as not being caused by a real gas leak.

7. The system of claim 5, wherein the third output state corresponds to the detection of a real gas leak that is small enough in magnitude to produce a sound pressure value less than the gas detection threshold value.

8. The system of claim 7, wherein the third output state corresponds to a detection of a minor leak.

9. An ultrasonic gas leak detector configured to discriminate the ultrasound generated by a pressurized gas leak into the atmosphere from false alarm ultrasound, comprising:
   a sensor for detecting ultrasonic energy and providing sensor signals;
   an electronic controller responsive to digital sensor signals representative of the sensor signals, the electronic controller configured to provide:
   a preprocessing function including an algorithm configured for joint time frequency signal preprocessing the digital sensor signals to provide preprocessed signals;

a sound pressure calculation function responsive to the preprocessed signals to provide computed sound pressure values representative of sound pressures sensed by the sensor;

a threshold comparator function to compare the computed sound pressure values to a gas detection threshold value to determine whether the computed sound pressure values exceed the gas detection threshold value and provide a threshold comparator output indicating whether the gas detection threshold value has been exceeded;

an Artificial Neural Network (ANN) function for processing the preprocessed signals and applying ANN coefficients configured to discriminate false alarm sources from gas leaks, and providing ANN outputs indicating an ANN decision whether a gas leak has been detected;

an output function for generating detector outputs in dependence on the threshold comparator outputs and the ANN output.

10. The system of claim 9, wherein said algorithm is adapted to perform one of a Discrete Fourier Transform, a Short Time Fourier Transform with a shifting time window or a Discrete Wavelet Transform.

11. The system of claim 9, wherein the sensor is an ultrasonic microphone.

12. The system of claim 9, wherein the detector outputs provide at least four output states, wherein:
a first output state results from a combination that the ANN output signal indicates that a gas leak has been detected, and that the threshold comparator output signal indicates that a gas leak may have been detected;
a second output state results from a combination that the ANN output signal indicates that a gas leak has not been detected, and that the threshold comparator output signal indicates that a gas leak may have been detected;
a third output state results from the combination that the ANN output signal indicates that a gas leak has been detected, and that the threshold comparator output signal indicates that a gas leak has not been detected: and
a fourth output state results from the combination that the ANN output signal indicates that a gas leak has not been detected, and that the threshold comparator output signal indicates that a gas leak has not been detected.

13. The system of claim 12, further comprising an alarm relay, and wherein the detector output generated by the electronic controller is configured to activate the alarm relay in the event of the first output state.

14. The system of claim 9, wherein the ANN function includes applying predetermined trained connection weights stored in memory of the electronic controller, said weights a result of exposure to a plurality of combinations of ultrasound generated by real gas leaks, false alarm sources comprising mechanical, electrical, acoustic or biological sources, and combinations of real gas leaks and false alarm sources.

15. The system of claim 9, wherein said detector outputs comprise one or more detector outputs indicating a condition resulting from the combination that the ANN output indicates a gas leak has been detected and the computed sound pressure value does not exceed the gas detection threshold value.

16. An ultrasonic gas leak detector configured to discriminate the ultrasound generated by a pressurized gas leak into the atmosphere from false alarm, comprising:
a sensor for detecting ultrasonic energy and providing sensor signals;
an electronic controller responsive to digital sensor signals representative of the sensor signals, the electronic controller configured to provide:
a computation function for generating sensor signal values representative of sensed ultrasonic energy, wherein the sensor signal values are computed sound pressure values;
an Artificial Neural Network (ANN) function for processing signals derived from the digital sensor signals and applying ANN coefficients configured to discriminate false alarm sources from gas leaks, and providing ANN outputs indicating a decision whether a gas leak has been detected, the ANN outputs including at least two output states, wherein a first ANN output state indicates that a gas leak has been detected, and a second ANN output state indicates that a gas leak has not been detected;
a system output function for generating detector outputs indicative of the ANN outputs and the sensor signal values, wherein the system output function generates a first detector output in dependence on the ANN outputs and a second detector output indicative of the computed sound pressure values.

17. The system of claim 16, wherein:
the electronic controller is further configured to provide a preprocessing function including an algorithm configured for joint time frequency signal preprocessing the digital sensor signals to provide preprocessed signals; and
the computation function and the ANN function each process the preprocessed signals to provide the sensor signal values and the ANN outputs.

18. The system of claim 17, wherein said algorithm is adapted to perform one of a Discrete Fourier Transform, a Short Time Fourier Transform with a shifting time window or a Discrete Wavelet Transform.

* * * * *